United States Patent
Sharma (10) Patent No.: US 9,680,965 B2
(45) Date of Patent: Jun. 13, 2017

(54) SOFTWARE UPGRADES FOR OFFLINE CHARGING SYSTEMS WITHIN A NETWORK

(71) Applicant: Alcatel-Lucent USA Inc., Murray Hill, NJ (US)

(72) Inventor: Ranjan Sharma, New Albany, OH (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 14/676,773

(22) Filed: Apr. 1, 2015

(65) Prior Publication Data
US 2016/0291957 A1     Oct. 6, 2016

(51) Int. Cl.
*G06F 9/44*     (2006.01)
*G06F 9/445*    (2006.01)
*H04L 29/08*    (2006.01)
*G06F 9/455*    (2006.01)

(52) U.S. Cl.
CPC .............. *H04L 67/34* (2013.01); *G06F 8/67* (2013.01); *G06F 9/45558* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 5,155,837 A | * | 10/1992 | Liu ........................... | G06F 8/67 709/221 |
| 6,535,924 B1 | * | 3/2003 | Kwok ....................... | G06F 8/67 709/242 |
| 7,107,329 B1 | * | 9/2006 | Schroder ................... | G06F 8/67 709/221 |
| 7,430,735 B1 | * | 9/2008 | Balakrishnan ............ | G06F 8/67 717/170 |

(Continued)

OTHER PUBLICATIONS

P. Calhoun, et al., Diameter Base Protocol, RFC3588, The Internet Society, 2003.

(Continued)

*Primary Examiner* — Tuan Q. Dam
*Assistant Examiner* — Zheng Wei
(74) *Attorney, Agent, or Firm* — Duft Bornsen & Fettig, LLP (57) ABSTRACT

Systems and methods for performing a software upgrade for a first offline charging system (OFCS) having a plurality of virtual machines implementing charging functions for offline charging. For the upgrade, a controller identifies a subset of the virtual machines in the first OFCS to remove from service, transmits a request to a distributor to reduce the distribution of the accounting requests in proportion to the number of the virtual machines removed from service, and removes the subset of virtual machines from service in the first OFCS. The controller also constructs updated virtual machines having the software upgrade in a second OFCS to replace the virtual machines removed from the first OFCS, and transmits a request to the distributor to increase distribution of the accounting requests to the second OFCS in proportion to the number of the updated virtual machines constructed in the second OFCS.

18 Claims, 7 Drawing Sheets

(56) References Cited

U.S. PATENT DOCUMENTS

| | | | | |
|---|---|---|---|---|
| 7,555,751 B1* | 6/2009 | Abbavaram | G06F 8/67 | 717/168 |
| 7,814,495 B1* | 10/2010 | Lim | G06F 9/45558 | 717/168 |
| 7,940,904 B2* | 5/2011 | Cai | H04M 15/00 | 379/114.26 |
| 8,521,884 B2* | 8/2013 | Hsu | H04L 29/12028 | 705/405 |
| 8,555,271 B2* | 10/2013 | Sprigg | G06F 8/65 | 717/168 |
| 8,782,632 B1* | 7/2014 | Chigurapati | G06F 8/65 | 717/168 |
| 8,839,228 B2* | 9/2014 | Thorat | G06F 8/65 | 717/172 |
| 9,106,769 B2* | 8/2015 | Kanode | H04L 43/16 | |
| 9,280,338 B1* | 3/2016 | Stickle | G06F 8/65 | |
| 2003/0154264 A1* | 8/2003 | Martin | G06F 8/67 | 709/221 |
| 2005/0043952 A1* | 2/2005 | Sharma | H04M 3/4938 | 704/270.1 |
| 2005/0120346 A1* | 6/2005 | Sprigg | G06F 8/65 | 717/176 |
| 2005/0176438 A1* | 8/2005 | Li | H04W 12/08 | 455/450 |
| 2007/0002732 A1* | 1/2007 | Batni | G06F 9/445 | 370/229 |
| 2007/0169102 A1* | 7/2007 | Gish | G06F 8/67 | 717/170 |
| 2007/0294662 A1* | 12/2007 | Kim | B25J 9/1661 | 717/107 |
| 2011/0010457 A1* | 1/2011 | Tanttu | H04L 12/14 | 709/226 |
| 2011/0010461 A1* | 1/2011 | Lassila | H04L 12/14 | 709/231 |
| 2011/0061061 A1* | 3/2011 | Chen | H04L 63/08 | 719/313 |
| 2011/0154320 A1* | 6/2011 | Verma | G06F 8/63 | 718/1 |
| 2011/0265076 A1* | 10/2011 | Thorat | G06F 8/65 | 717/172 |
| 2011/0271270 A1* | 11/2011 | Bowen | G06F 8/67 | 717/171 |
| 2012/0072893 A1* | 3/2012 | Gupta | G06F 8/65 | 717/168 |
| 2012/0072894 A1* | 3/2012 | Wang | G06F 8/65 | 717/168 |
| 2012/0102480 A1* | 4/2012 | Hopmann | G06F 8/67 | 717/172 |
| 2012/0117562 A1* | 5/2012 | Jess | G06F 9/45558 | 718/1 |
| 2012/0266171 A1 | 10/2012 | Byun et al. | | |
| 2013/0275583 A1* | 10/2013 | Roach | H04L 43/08 | 709/224 |
| 2013/0326058 A1 | 12/2013 | Brady et al. | | |
| 2014/0123122 A1* | 5/2014 | Dhanyamraju | G06F 8/65 | 717/168 |
| 2014/0325514 A1* | 10/2014 | Benedetti | G06F 8/65 | 718/1 |
| 2014/0372984 A1* | 12/2014 | Stroomer | G06F 8/61 | 717/124 |
| 2014/0380307 A1* | 12/2014 | Zhu | G06F 9/45533 | 718/1 |
| 2015/0113142 A1* | 4/2015 | Adolph | H04L 47/70 | 709/226 |
| 2015/0143354 A1* | 5/2015 | Mathew | G06F 8/67 | 717/170 |
| 2015/0220324 A1* | 8/2015 | Arcese | G06F 8/63 | 717/170 |
| 2016/0117160 A1* | 4/2016 | Parthasarathy | G06F 8/65 | 717/171 |

OTHER PUBLICATIONS

V. Fajardo, Ed. et al, Diameter Base Protocol,RFC6733, Internet Engineering Task Force (IETF), Oct. 2012.

Korhonen, Diameter Overload Control Application, Nokia Siemens Networks, Oct. 2012.

Korhonen, Diameter Overload Control Application, Nokia Siemens Networks, Oct. 3, 2012.

\* cited by examiner

SOFTWARE UPGRADES FOR OFFLINE CHARGING SYSTEMS WITHIN A NETWORK

FIELD OF THE INVENTION

The invention is related to the field of communication systems and, in particular, to software upgrades within a network.

BACKGROUND

Software upgrades typically require that a system is taken out of service for a time period. During the software upgrade, systems are isolated from the network inputs and do not provide system functionality to the deployed topology. After the software upgrade, the system is gradually introduced to the network via a test phase, after which actual inputs may be introduced. A typical requirement from a service provider for a software upgrade in a network is that the upgrade should be restricted to a maintenance window (MW) of about 4 hours. This maintenance window is generally during non-peak hours, such as 2 AM to 6 AM. The idea is that there is minimal network activity during non-peak hours. With less traffic, and network elements can be upgraded in a relatively quiescent period without adversely affecting the operations of the network.

In next generation networks (e.g., $4^{th}$ Generation networks), data traffic rarely goes down to zero or near-zero during the non-peak hours. Users install and run applications on their smart devices that continually ping the network and get updates. Therefore, if a system is completely removed from service for a software upgrade, there may be an undesirable interruption of operations within the network. Service providers continually look for ways to perform software upgrades that are less disruptive to network operations, require minimal operator involvement, and consume the least amount of time.

SUMMARY

Embodiments described herein provide software upgrades to offline charging systems. An offline charging system as discussed herein includes a plurality of virtual machines (VM) that implement charging functions for offline charging, such as a Charging Data Function (CDF) and a Charging Gateway Function (CGF). To implement a software upgrade in an (antiquated) offline charging system, virtual machines of the offline charging system are gradually taken out of service in subsets, while "new" virtual machines are constructed in another (updated) offline charging system to replace the virtual machines taken out of service. During this process, a front-end distributor reduces the load to the antiquated offline charging system in proportion to the number of virtual machines taken out of service, while it increases the load to the updated offline charging system in proportion to the number of new virtual machines that are constructed. Because the antiquated system is gradually torn down as the updated system is gradually constructed, the load handling capacity of the offline charging systems (antiquated+updated) remains about the same as before the software upgrade was initiated. Therefore, the software upgrade should be less disruptive to offline charging operations.

One embodiment comprises a charging system having a controller. The controller is coupled to a first offline charging that includes a plurality of virtual machines implementing charging functions for offline charging, and coupled to a front-end distributor is configured to distribute accounting requests to the first offline charging system. The controller is configured to provide a software upgrade by iteratively performing the following: identify a subset of the virtual machines in the first offline charging system to remove from service, transmit a first request to the front-end distributor to reduce the distribution of the accounting requests to the first offline charging system in proportion to a number of the virtual machines removed from service in the first offline charging system, remove the subset of virtual machines from service in the first offline charging system, construct updated virtual machines having the software upgrade in a second offline charging system to replace the virtual machines removed from service in the first offline charging system, and transmit a second request to the front-end distributor to increase distribution of the accounting requests to the second offline charging system in proportion to a number of the updated virtual machines constructed in the second offline charging system.

In another embodiment, the first request comprises a Diameter Overload Control Application request.

In another embodiment, the front-end distributor comprises a Diameter Routing Agent (DRA).

In another embodiment, each of the plurality of virtual machines in the first offline charging system implements a Charging Data Function (CDF) and a Charging Gateway Function (CGF).

In another embodiment, the controller is configured to direct each of the plurality of virtual machines in the first offline charging system to communicate with cloud storage, and to store data for accounting sessions in the cloud storage.

In another embodiment, the controller is configured to direct a virtual machine in the first offline charging system to store data for a first accounting session in cloud storage before being removed, where the first accounting session is active when the virtual machine is removed from service. The controller is configured to direct an updated virtual machine constructed in the second offline charging system to retrieve the data for the first accounting session from the cloud storage, and to resume processing for the first accounting session based on the data. The controller is may be further configured to direct the updated virtual machine to generate a Charging Data Record (CDR) for the first accounting session based on the data retrieved from the cloud storage.

In another embodiment, the subset of the virtual machines in the first offline charging system to remove from service comprises a pair of virtual machines.

Another embodiment comprises a method for performing a software upgrade in offline charging systems. The method includes identifying a first offline charging system having a plurality of virtual machines implementing charging functions for offline charging, where the virtual machines of the first offline charging system run software that is out of date. The method further includes the iterative steps of:
  identifying a subset of the virtual machines in the first offline charging system to remove from service;
  transmitting a first request to a front-end distributor that distributes accounting requests to the first offline charging system, wherein the first request is to reduce the distribution of the accounting requests to the first offline charging system in proportion to a number of the virtual machines removed from service in the first offline charging system;

removing the subset of virtual machines from service in the first offline charging system;

constructing updated virtual machines having the software upgrade in a second offline charging system to replace the virtual machines removed from service in the first offline charging system; and transmitting a second request to the front-end distributor to increase distribution of the accounting requests to the second offline charging system in proportion to a number of the updated virtual machines constructed in the second offline charging system.

Another embodiment comprises a controller configured to provide a software upgrade for a first offline charging system, where the first offline charging system includes a plurality of virtual machines implementing charging functions for offline charging. The controller is configured to iteratively perform the following: identify a subset of the virtual machines in the first offline charging system to remove from service, transmit a first Diameter Overload Control Application request to a front-end distributor to reduce the distribution of the accounting requests to the first offline charging system in proportion to a number of the virtual machines removed from service in the first offline charging system, remove the subset of virtual machines from service in the first offline charging system, construct updated virtual machines having the software upgrade in a second offline charging system to replace the virtual machines removed from service in the first offline charging system, and transmit a second Diameter Overload Control Application request to the front-end distributor to increase distribution of the accounting requests to the second offline charging system in proportion to a number of the updated virtual machines constructed in the second offline charging system.

In another embodiment, the controller is configured to insert a reduction value in an OC-Sending-Rate Attribute Value Pair (AVP) of the first Diameter Overload Control Application request.

In another embodiment, the subset of the virtual machines in the first offline charging system to remove from service comprises a pair of virtual machines. The number of virtual machines in the first offline charging system (prior to the upgrade) comprises N. The controller is configured to insert a reduction value in an OC-Sending-Rate AVP of $(N-2)/N$.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
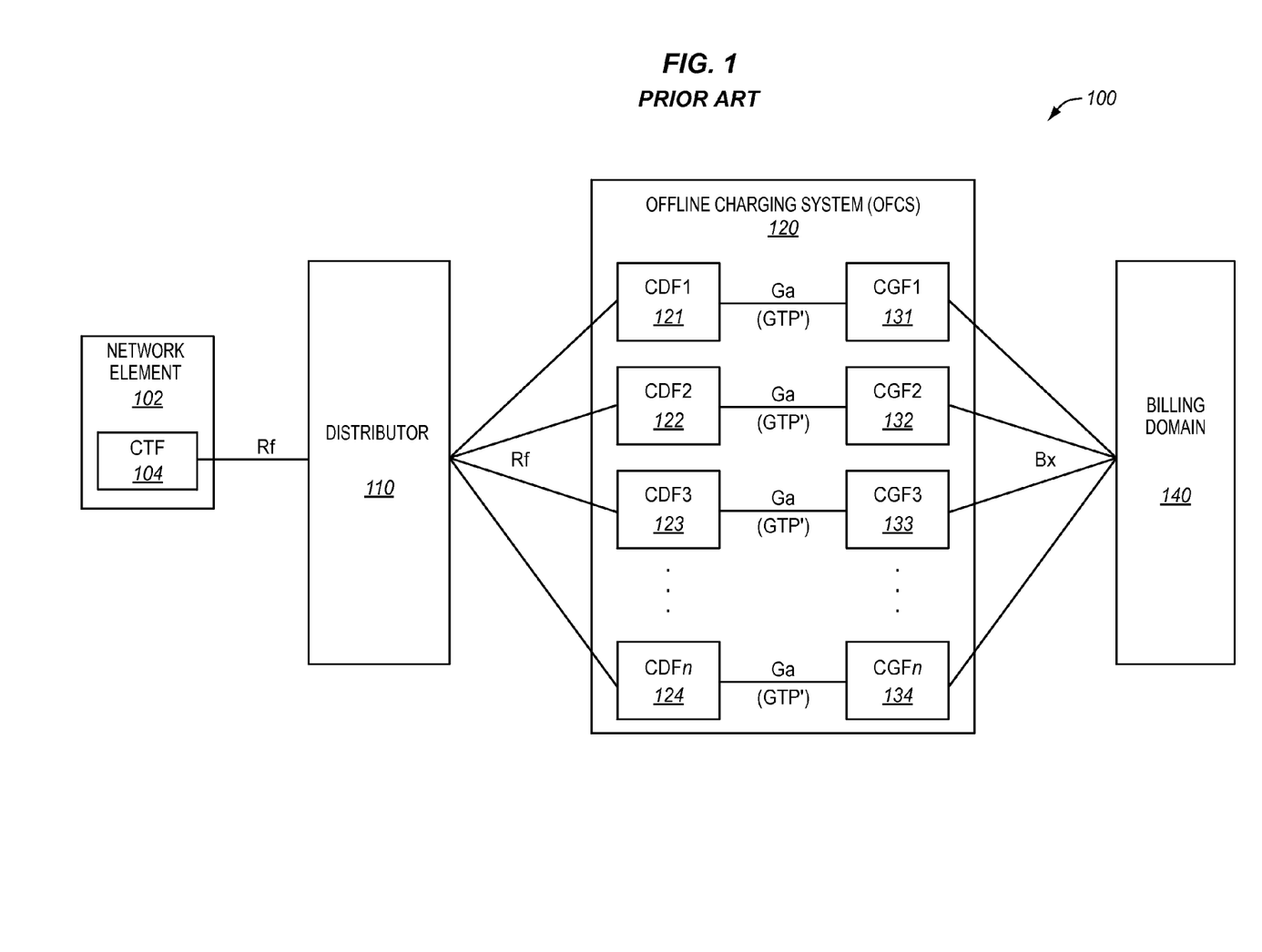
FIG. 1 illustrates an offline charging architecture in the prior art.

FIG. 1 illustrates an offline charging architecture 100 in the prior art. Architecture 100 includes a network element 102 that connects to an offline charging system (OFCS) 120 through a distributor 110. Network element 102 includes a Charging Trigger Function (CTF) 104 that detects chargeable events for services provided by network element 102, assembles information for the chargeable events into matching charging events, and sends the charging events to a Charging Data Function (CDF). In the case of network element 102, CTF 104 may use a Diameter Rf interface. Therefore, CTF 104 assembles the charging information into accounting requests, such as a Diameter Rf Accounting Request (ACR). Although one CTF 104 is illustrated in FIG. 1, there may be CTFs of many network elements in contact with distributor 110.

OFCS 120 is an apparatus, a server, a device, or equipment configured to implement offline charging for sessions or services provided by a network. Offline charging can be of two types: session-based or event-based. In event-based charging, the CTF reports the usage or the service rendered where the service offering is rendered in a single operation, such as subscriber registration, re-registration, de-registration, etc. The CTF reports the usage in an ACR EVENT. Session-based charging is the process of reporting usage reports for a session, and uses the START, INTERIM, and STOP accounting data. During a session, CTF 104 may transmit 0, 1, or multiple interim accounting requests depending on the proceeding of the session.

OFCS 120 includes multiple instances of a CDF (CDF1-CDFn) 121-124 and a CGF (CGF1-CGFn) 131-134. A CDF comprises an element or module within OFCS 120 that receives charging events from CTFs within network elements, formats the charging events into CDRs, and sends the CDRs to a CGF. A CGF comprises an element or module within OFCS 120 that correlates CDRs for a session, and forwards a CDR file with the correlated CDRs to a billing domain 140. Billing domain 140 is the part of the operator network that receives and processes CDR files for billing mediation and other billing applications (e.g., statistical applications). The CDFs in OFCS 120 may communicate with the CGFs over a Diameter Ga interface. In the case shown in FIG. 1, GTP' may be used on the Ga interface to transport CDRs from the CDFs to the CGFs. While a 1:1 relationship is shown between the CDFs and CGFs in FIG. 1, an N:1 relationship is also possible.

Distributor 110 is implemented between CTFs (e.g., CTF 104) and the CDFs 121-124 in OFCS 120. The purpose of distributor 110 is to distribute accounting requests (e.g., Diameter ACRs) from CTFs among the multiple CDFs 121-124 within OFCS 120. Distributor 110 may select CDFs for handling accounting requests based on a distribution algorithm, such as a "consistent hashing" algorithm.

Figure 2:
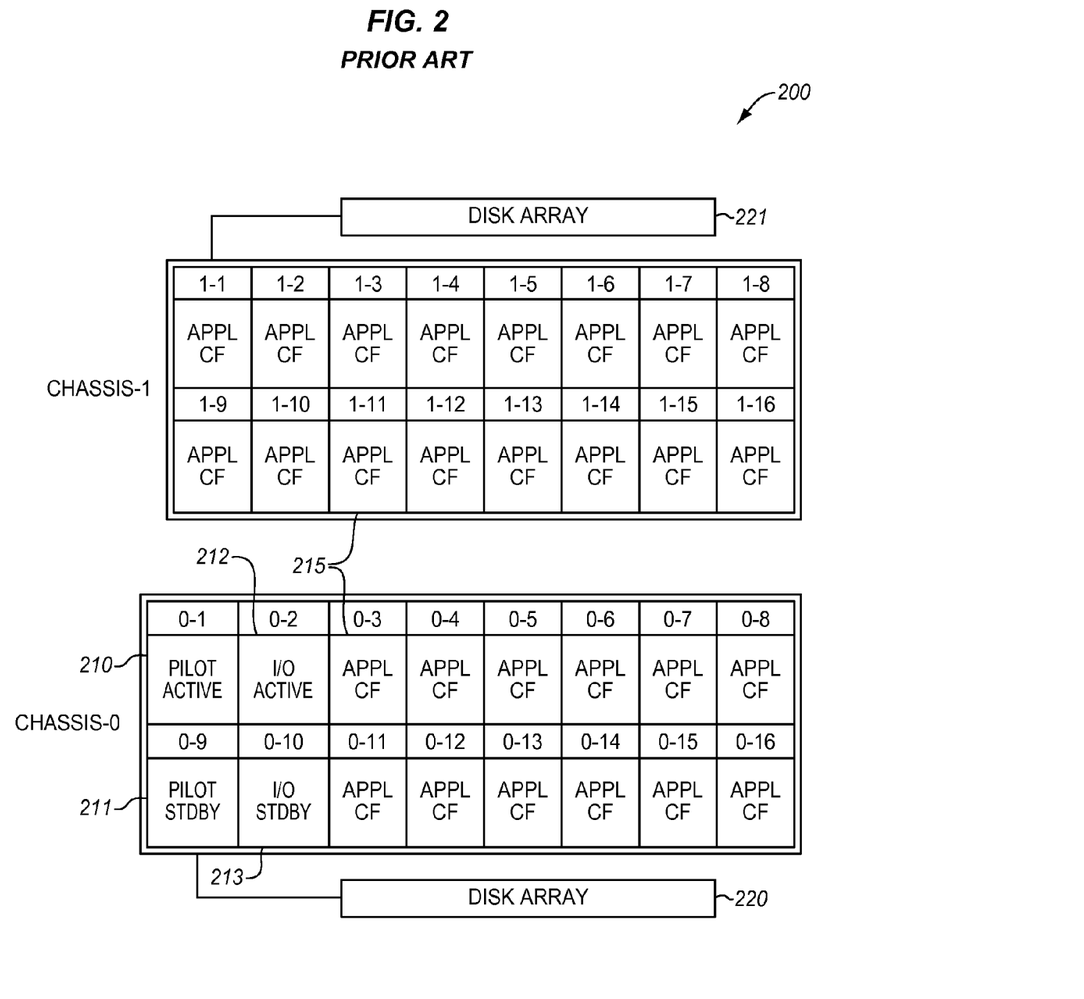
FIG. 2 illustrates a blade server used to implement an offline charging system in the prior art.

One way of implementing an offline charging system is with a blade server. FIG. 2 illustrates a blade server 200 used to implement an offline charging system in the prior art. Blade server 200 includes two chassis each including sixteen blades. Chassis-0 includes a pair of pilot blades 210-211 that perform administrative functions. Pilot blades 210-211 work in an active/standby mode. The active pilot blade 210 attaches to a virtual IP address, and is monitored via heartbeat messaging by the standby pilot blade 211. In case of failure of the active pilot blade 210, the standby pilot blade 211 assumes the virtual IP address.

Blade server 200 also includes one or more pairs of Input/Output (I/O) blades 212-213 that act as the ingress point to the system. For instance, the I/O blades 212-213 may communicate with a distributor over a Diameter Rf reference point to exchange accounting messages. I/O blades 212-212 may also work in an active/standby mode.

Blade server 200 also includes multiple Charging Function (CF) blades 215 that each executes application logic to provide offline charging functionality. Each of the CF blades may provide CDF and CGF functionality. Blade server 200 also includes disk arrays 220-221 that are used by the blades to store generated CDRs.

One existing method for performing a software upgrade on an offline charging system as in FIGS. 1-2 includes isolating the system from the input side, draining the output side, and then taking the system out-of-service to perform the software upgrade. One problem with this method is the loss of capacity while the system is out-of-service and not accepting any traffic. The entire system is taken down and isolated before performing the software upgrade. The resulting loss in capacity is sizeable, even if the duration of the upgrade is small.

Another method for performing a software upgrade is a blade-by-blade upgrade. Some problems associated with a blade-by-blade upgrade are that the standby pilot blade may fail when an upgrade is being performed on the active pilot blade, that the standby I/O blade may fail when an upgrade is being performed on the active I/O blade, handling a situation where some blades are executing one version of software while others are executing a different version of the software, and the duration of the software upgrade itself.

Yet another method for performing a software upgrade is to divert traffic away from the system that is to be upgraded. For all new accounting sessions (identified by the receipt of an Accounting Start (i.e., ACR Start)), the OFCS that is being readied for an upgrade sends back an Accounting Answer (ACA) indicating a Diameter 3004 Diameter_Too_Busy (DTB). This causes the CTF to seek an alternate Diameter peer and to send the accounting messages to a secondary OFCS. A problem with this approach is that ongoing sessions are still held at the previous OFCS, which cannot be isolated from the traffic while accounting sessions are still active.

Yet another method for performing a software upgrade is to indiscriminately send a Diameter_Too_Busy (DTB) response to all session accounting messages being sent to an OFCS in order to forcibly terminate all ongoing accounting sessions on the system targeted for the upgrade. A problem with this approach is that the accounting sessions get split across two OFCS's and results in the generation of "Incomplete CDRs" for all of the accounting sessions in progress. A forced failover like this causes the ACR[Start] and ACR [Stop] for the accounting sessions to end up at different OFCSs. The OFCS that receives an ACR[Start] but no corresponding ACR[Stop] or a timely ACR[Interim], closes the CDR with the reason for closure marked as "missing ACR[Stop]". Likewise, the OFCS that receives an ACR [Stop] but no corresponding ACR[Start], closes the CDR with the reason for closure marked as "missing ACR[Start]". Therefore, all session-based accounting runs the risk of being handled in an abrupt manner, and this puts the onus on the downstream billing mediation systems to meaningfully piece together incomplete CDRs for the same session coming from different OFCSs.

Figure 3:
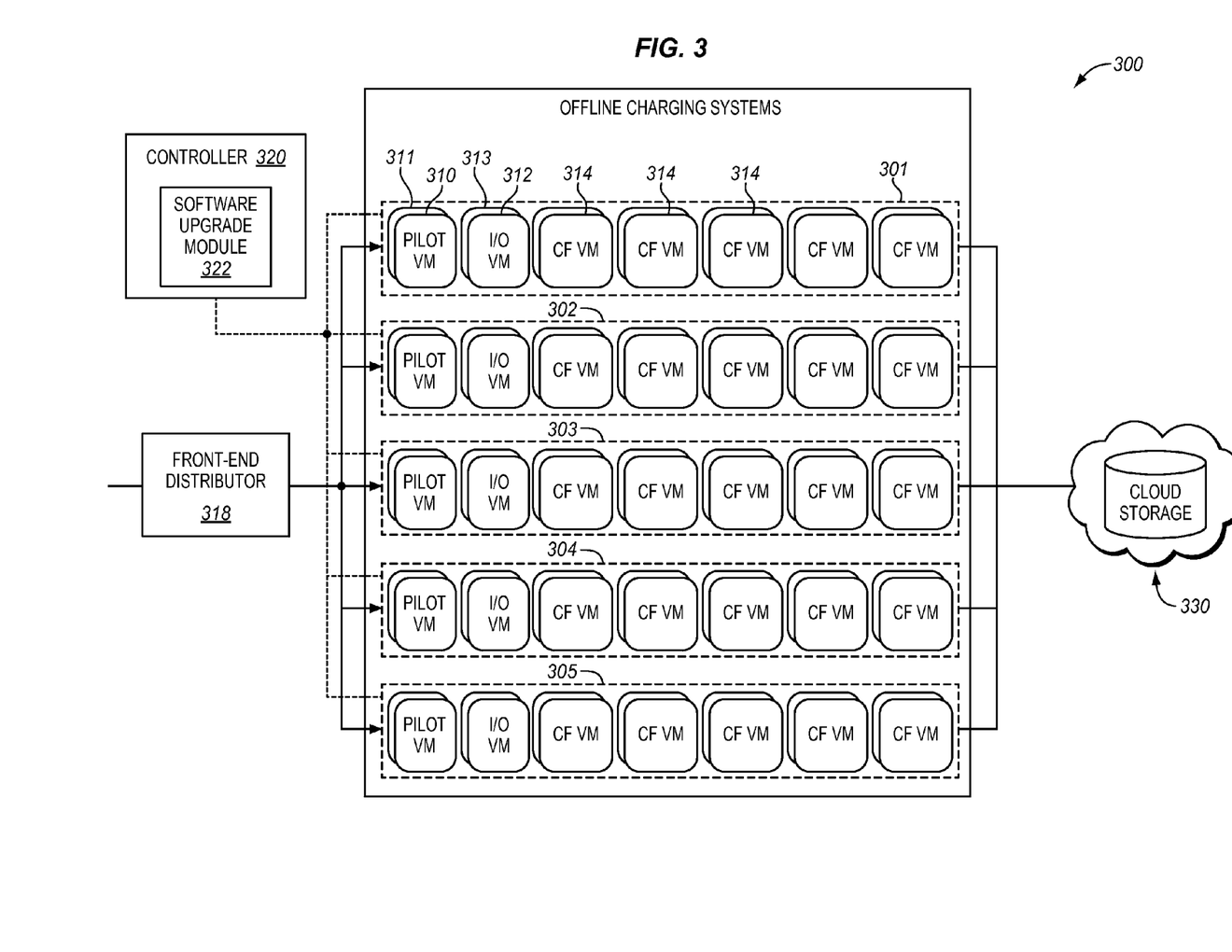
FIG. 3 illustrates a virtualized offline charging architecture in an exemplary embodiment.

The embodiments described herein provide an efficient manner for software upgrades within a virtualized architecture of an offline charging system. FIG. 3 illustrates a virtualized offline charging architecture 300 in an exemplary embodiment. The architecture 300 (also referred to as a "charging system") includes a plurality of offline charging systems (OFCS) 301-305 each comprised of a plurality of virtual machines (VM). A virtual machine is a software computer that runs an operating system and one or more applications, which imitates hardware. Specialized software called a "hypervisor" emulates a Central Processing Unit (CPU), memory, hard disk, network, and other hardware resources. Many virtual machines are able to share the physical resources of a host, and a pool of distributed hardware resources from different hardware platforms may be used to implement multiple virtual machines. Each OFCS 301-305 may be implemented using the physical resources of a single host, or may be implemented using physical resources distributed among multiple hosts.

In this embodiment, OFCS 301 includes an active pilot (or administrator) virtual machine (VM) 310, a standby pilot virtual machine 311, an active I/O virtual machine 312, a standby I/O virtual machine 313, and a plurality of Charging Function (CF) virtual machines 314 (also referred to as application virtual machines). The CF virtual machines 314 implement charging functions for offline charging, which includes handling accounting requests. For example, each CF virtual machine 314 may provide an instance of a CDF and CGF, or an instance of a Charging Collector Function (CCF), that process accounting requests (e.g., ACR) and generate CDRs. The other OFCSs 302-305 include a similar virtual structure as OFCS 301.

Architecture 300 also includes a front-end distributor 318 and a controller 320 coupled to each of the OFCSs 301-305. Distributor 318 comprises an apparatus, a server, a device, a virtual machine, an application, or equipment that is configured to distribute accounting requests (e.g., Diameter ACRs) among the OFCSs. Distributor 318 may comprise a Diameter Routing Agent (DRA) as suggested by the 3GPP. Controller 320 comprises an apparatus, a server, a device, a virtual machine, an application, or equipment that is configured to implement a software upgrade to offline charging systems. Controller 320 may include a software upgrade module 322 that implements software upgrades as described herein. Among its duties, software upgrade module 322 may identify an OFCS targeted for a software upgrade, identify updated software (e.g., a new version or new release of software), and control the software upgrade as described in more detail below.

Architecture 300 also shows that OFCSs 301-305 are connected to cloud storage 330. Cloud storage 330 represents a storage system where data is stored in logical pools. Cloud storage 330 may be hosted on a remote platform that is accessible to OFCSs 301-305 over a network, such as the internet. When OFCSs 301-305 handle accounting sessions (e.g., Diameter sessions), they may store data for the accounting session on cloud storage 330.

When performing a software upgrade on an OFCS, controller 320 gradually removes virtual machines from this OFCS while constructing virtual machines in a new OFCS that is configured with the upgraded software. This process is further illustrated in FIG. 4.

Figure 4:
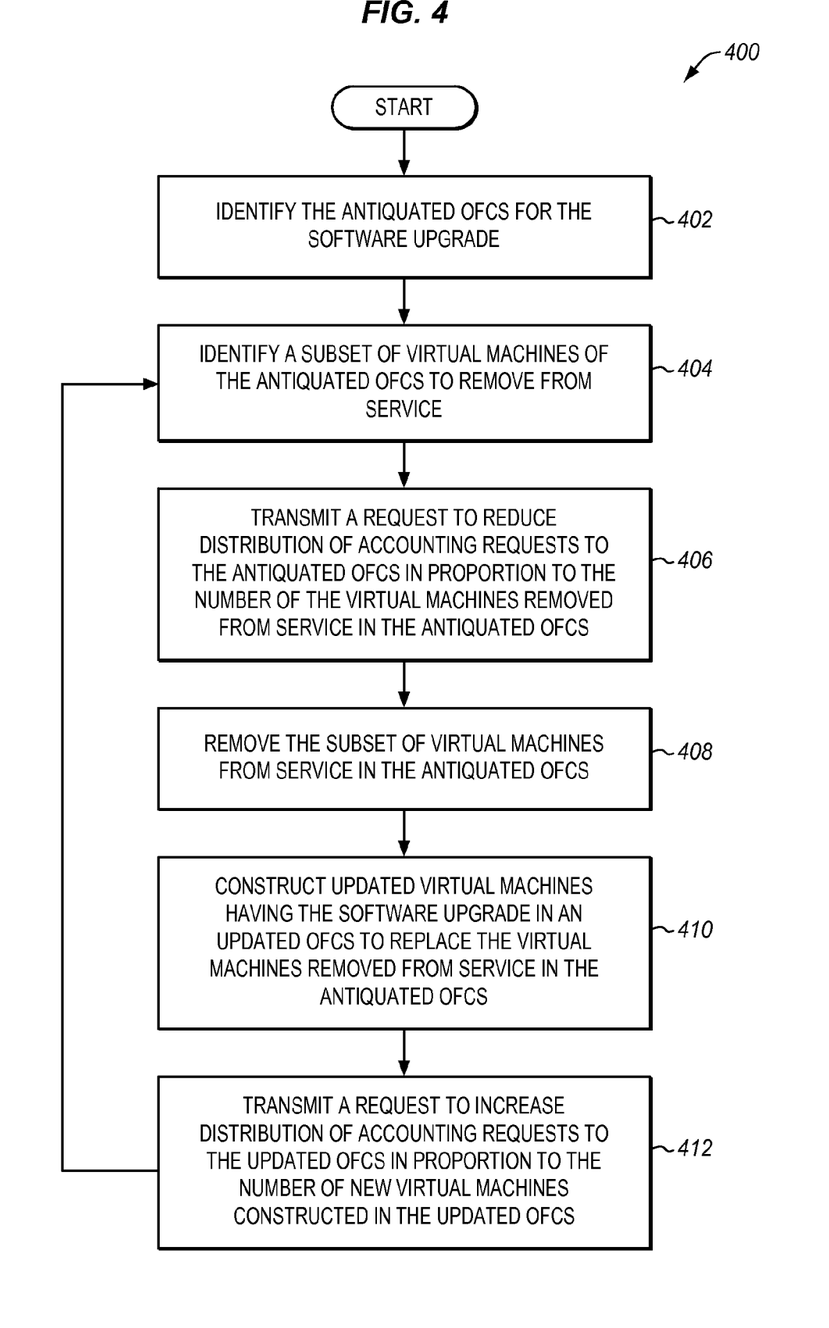
FIG. 4 is a flow chart illustrating a method for performing a software upgrade for an offline charging system in an exemplary embodiment.

FIG. 4 is a flow chart illustrating a method 400 for performing a software upgrade for an offline charging system in an exemplary embodiment. The steps of method 400 will be described with reference to architecture 300 in FIG. 3, but those skilled in the art will appreciate that method 400 may be performed in other systems. Also, the steps of the flow charts described herein are not all inclusive and may include other steps not shown, and the steps may be performed in an alternative order.

Controller 320 initiates the software upgrade for a particular OFCS, such as through software upgrade module 322. In initiating the upgrade, controller 320 identifies the OFCS for the upgrade (step 402), which is OFCS 301 in this example. The OFCS targeted for a software upgrade may be referred to as an "antiquated OFCS", as its software is out of date. Controller 320 also identifies the particular service pack, new release, new version, etc., of the software desired for this OFCS.

Figure 5:
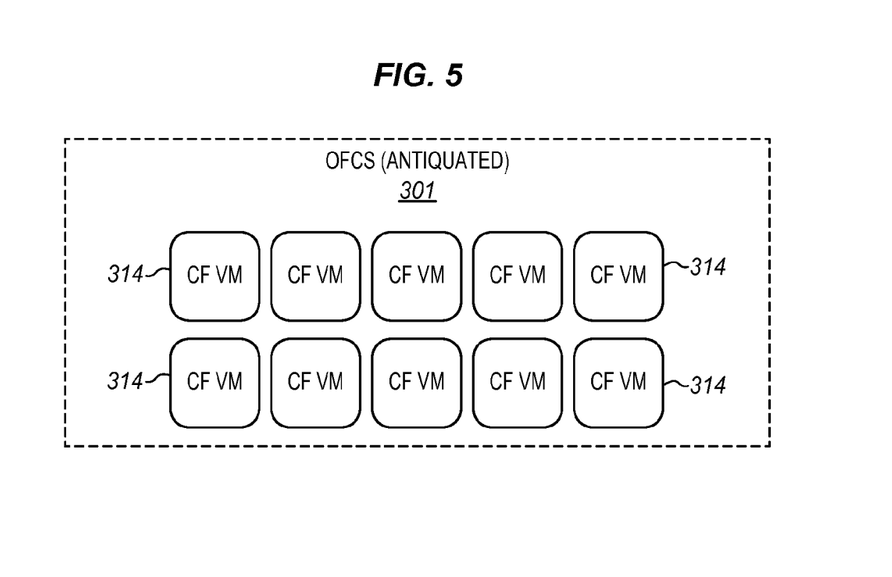
FIG. 5 illustrates virtual machines in an offline charging system in an exemplary embodiment.

With the OFCS 301 identified for the upgrade, controller 320 identifies a subset of the virtual machines in OFCS 301 to remove from service (step 404). Because controller 320 is gradually tearing down the OFCS 301 having the outdated software, controller 320 identifies one or more virtual machines to remove from service. The number of virtual machines in the subset are less than (or a fractional number of) the total number of virtual machines that were implemented in OFCS 301 before the upgrade. FIG. 5 illustrates virtual machines 314 in OFCS 301 in an exemplary embodiment. In this example, OFCS 301 includes ten virtual machines 314 that implement charging functions. Controller 320 may select a fractional number of these ten virtual machines 314 for the subset in step 404. For instance, controller 320 may select a pair (two) of virtual machines 314 in one embodiment.

As virtual machines that handle accounting requests are selected for removal from OFCS 301, the capacity of OFCS 301 will be reduced. Therefore, controller 320 transmits a request to front-end distributor 318 to reduce the distribution of accounting requests from front-end distributor 318 to OFCS 301 (step 406). Prior to the software upgrade, front-end distributor 318 routes accounting requests to OFCS 301 according to a certain volume or load level negotiated based on the capacity of OFCS 301. Because the subset of virtual machines 314 are being removed from service, controller 320 requests that the distribution of accounting requests is reduced in proportion to the number of the virtual machines removed from service in OFCS 301. In the request, controller 320 may indicate a percentage to reduce distribution of the accounting requests. For example, if there were N virtual machines in OFCS 301 that handle accounting requests and two are being removed from service, then controller 320 may request that distribution is reduced by 2/N. In the example shown in FIG. 5, the distribution would be reduced by 20%. Controller 320 may also indicate a reduction to the negotiated capacity of OFCS 301. For example, controller 320 may request a reduction to (N−2)/N (or 80%) of the negotiated capacity.

It is assumed that front-end distributor 318 reduces the load on OFCS 301 based on the request from controller 320. Controller 320 may then remove the subset of virtual machines 314 from service in OFCS 301 (step 408), and does not replace them within OFCS 301.

Controller 320 also constructs "updated" virtual machines having the software upgrade in a new or updated OFCS (step 410). The updated virtual machines are constructed to replace the virtual machines removed from service in OFCS 301. To construct the updated virtual machines, controller 320 may acquire a number (one or more) of virtual machines from a resource pool, and load the image for the desired software on the virtual machines. These "new" or "updated" virtual machines are equipped with resources (virtual CPUs, RAM, storage, etc.) substantially identical to the "antiquated" virtual machines. The new images provide the necessary software upgrade. The number of updated virtual machines constructed in this step is proportional to the number of virtual machines removed from OFCS 301 in step 408. It is assumed that any administrative (e.g., pilot) virtual machines and I/O virtual machines have already been constructed in the updated OFCS before the virtual machines are constructed which actually handle accounting requests (e.g., CF VM).

Figure 6:
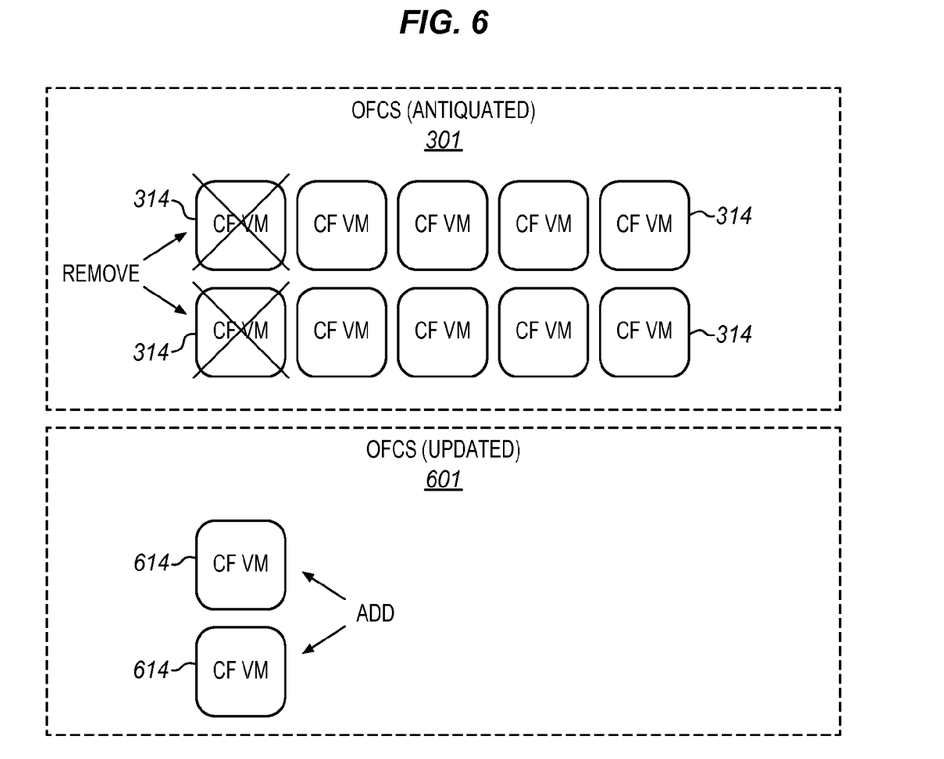
FIG. 6 illustrates a pair of virtual machines removed from an offline charging system and a pair of updated virtual machines constructed in an updated an offline charging system in an exemplary embodiment.

FIG. 6 illustrates a pair of virtual machines removed from OFCS 301 and a pair of updated virtual machines constructed in an updated OFCS in an exemplary embodiment. As illustrated in FIG. 6, controller 320 removes two virtual machines 314 from service in OFCS 301. Controller 320 also constructs two updated virtual machines 614 in an updated OFCS 601. Thus, the updated virtual machines 614 replace the virtual machines 314 removed from OFCS 301.

With the updated virtual machines 614 constructed, controller 320 transmits a request to front-end distributor 318 to increase distribution of accounting requests to the OFCS 601 (step 412 in FIG. 4). One assumption for step 412 is that the virtual machines 614 constructed in OFCS 601 are for handling accounting requests (e.g., CF VM) instead of an administrative or I/O VM. Because the updated virtual machines 614 have been added, controller 320 requests that the distribution of accounting requests is increased in proportion to the number of the virtual machines 614 constructed in the OFCS 601. In the request, controller 320 may indicate a percentage to increase distribution of accounting requests. For example, if there will be N virtual machines constructed in OFCS 601 and two virtual machines have been added at this point, then controller 320 may request that distribution is increased by 2/N of full capacity. It is assumed that front-end distributor 318 increases the load on OFCS 601 based on the request from controller 320.

At this point, OFCS 301 receives a reduced load from front-end distributor 318, while OFCS 601 receives an increased load from front-end distributor 318. In the example provided in FIG. 6, two virtual machines 314 have been removed from OFCS 301 and two virtual machines 614 have been added to OFCS 601 to replace the virtual machines removed from OFCS 301. Therefore, the overall capacity of OFCS 301 and OFCS 601 combined for handling accounting requests should be about the same as the processing capacity of OFCS 301 alone before the software upgrade began.

Figure 7:
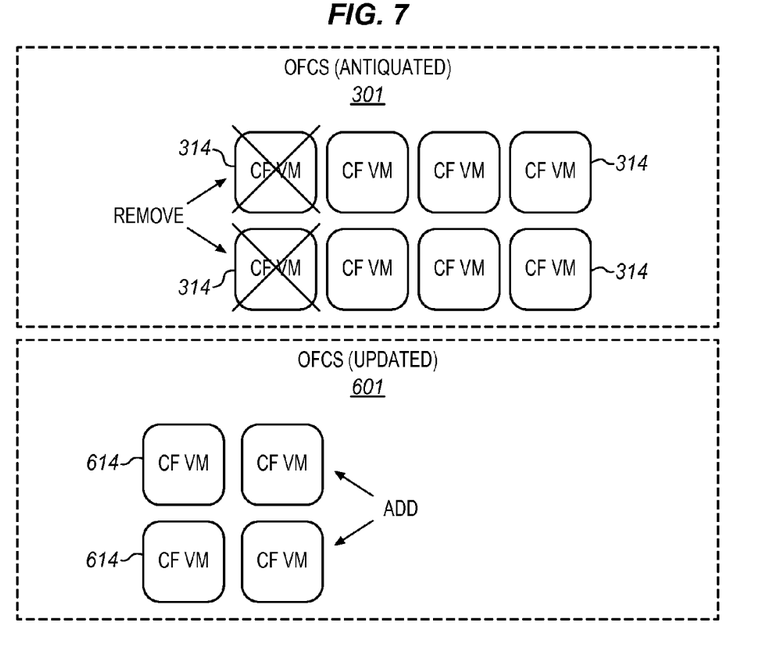
FIG. 7 illustrates another pair of virtual machines removed from an offline charging system and another pair of updated virtual machines constructed in an updated an offline charging system in an exemplary embodiment.

Method 400 then repeats in steps 404-412 to remove another subset of virtual machines 314 from OFCS 301 and construct updated virtual machines 614 in OFCS 601. FIG. 7 illustrates another pair of virtual machines removed from OFCS 301 and another pair of updated virtual machines constructed in OFCS 601 in an exemplary embodiment. As illustrated in FIG. 7, controller 320 removes two more virtual machines 314 from service in OFCS 301. Controller 320 also constructs two more updated virtual machines 614 in OFCS 601. Thus, the updated virtual machines 614 replace the virtual machines 314 removed from OFCS 301. Controller 320 also communicates with front-end distributor 318 to increase distribution of accounting requests to OFCS 601 (step 412 in FIG. 4), and reduce distribution of accounting requests to OFCS 301.

Figure 8:
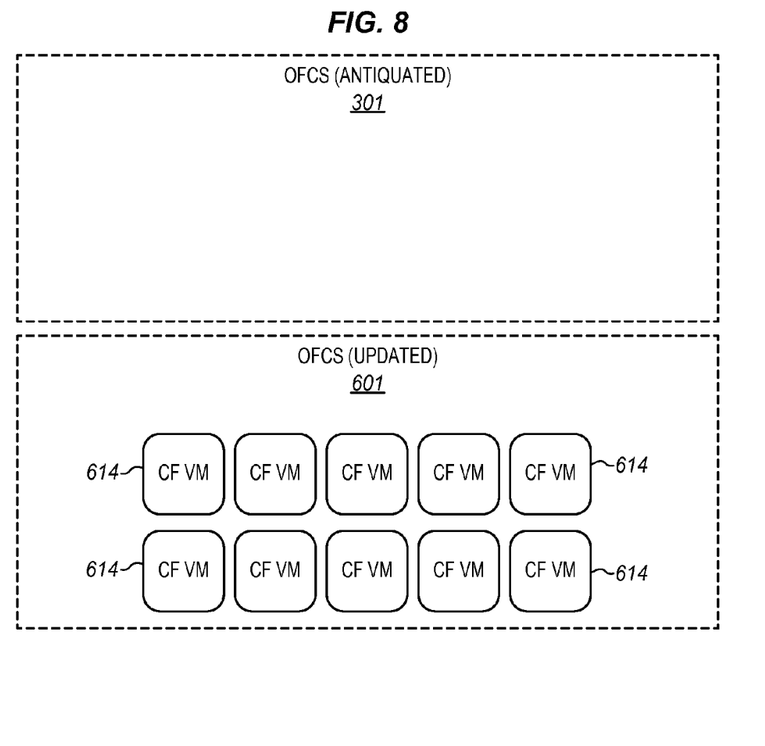
FIG. 8 illustrates virtual machines removed from an offline charging system and updated virtual machines constructed in an updated an offline charging system in an exemplary embodiment.

Method 400 continues to repeat in steps 404-412 until OFCS 301 is torn down (i.e., all virtual machines have been removed) and OFCS 601 is fully constructed, as shown in FIG. 8. OFCS 601 is shown as included ten virtual machines that implement charging functions (e.g., a CDF/CGF) for handling accounting requests. Controller 320 may also construct pilot virtual machines (active and standby) and I/O virtual machines (active and standby) in OFCS 601 in a similar manner.

When virtual machines are removed from one OFCS and constructed in another OFCS, it may be advantageous for the virtual machines to store data for accounting sessions in cloud storage 330 (see FIG. 3). For instance, virtual machines in OFCS 301 may use cloud storage 330 as a repository for data regarding accounting sessions (such as under direction of controller 320). When a virtual machine is removed from OFCS 301 during the software upgrade process, there may be one or more accounting sessions active for this virtual machine. When a new or updated virtual machine is constructed in OFCS 601, it is able to retrieve the data for the accounting session(s) from cloud storage 330, and resume processing for the accounting session(s) based on the data. Therefore, even if a virtual machine in OFCS 301 began an accounting session (i.e., received an ACR START), a virtual machine in OFCS 601 may take over the accounting session based on the data retrieved from cloud storage 330 to ultimately generate a Charging Data Record (CDR) for the accounting session.

EXAMPLE

Figure 9:
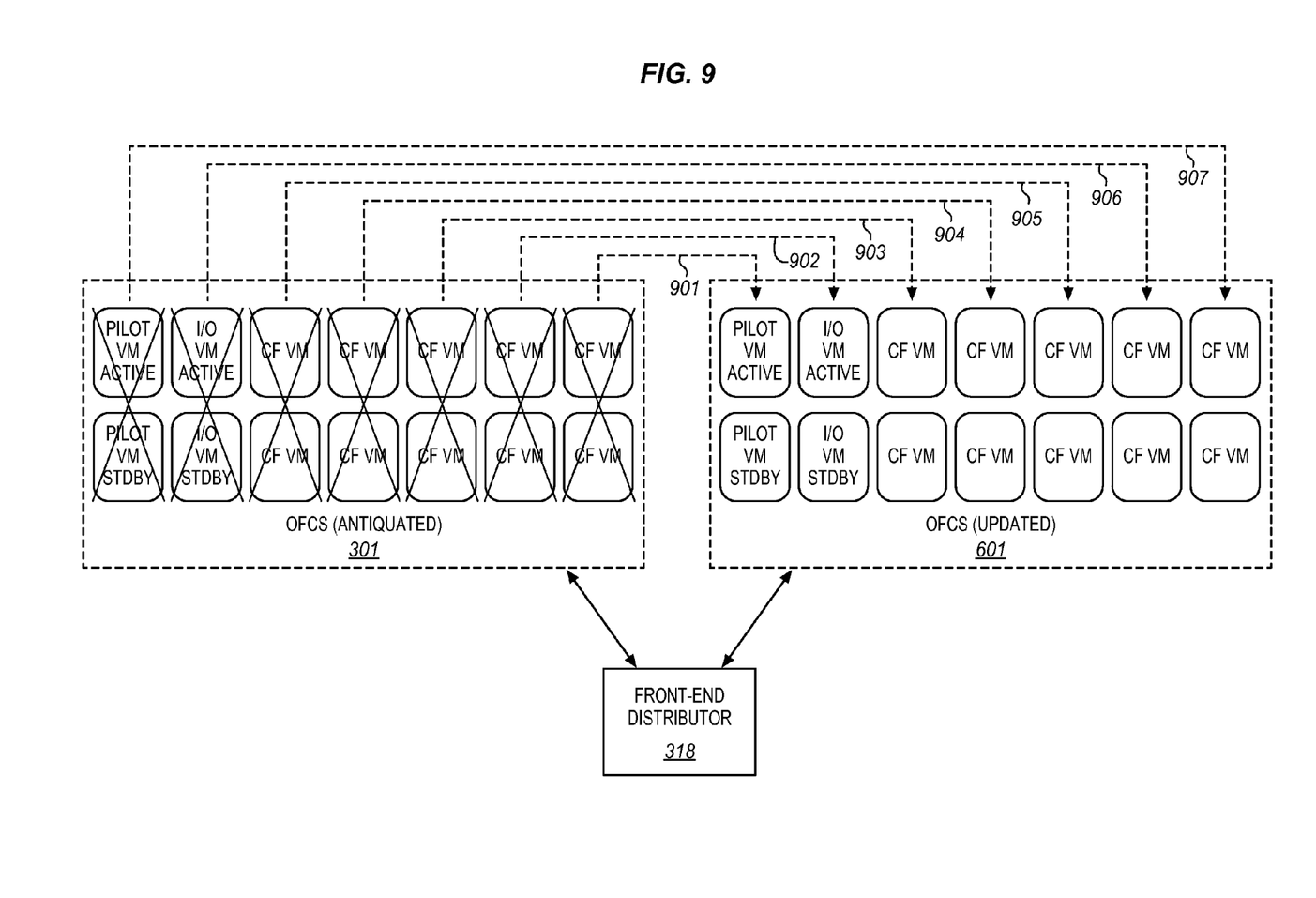
FIG. 9 shows a progression of removing virtual machines from one offline charging system and constructing virtual machines in another offline charging system in an exemplary embodiment.

The following provides an example of performing a software upgrade. FIG. 9 shows a progression of removing virtual machines from OFCS 301 and constructing virtual machines in OFCS 601 in an exemplary embodiment. In the first progression 901, controller 320 (see FIG. 3) removes a pair of CF virtual machines from OFCS 301, and constructs a pair of pilot virtual machines in OFCS 601. Controller 320 may also interact with front-end distributor 318 in accordance with the Diameter Overload Control Application (DOCA) to modify distribution of accounting requests (internet draft at https://tools.ietf.org/html/draft-korhonen-dime-ov1-00). The following is an example of using DOCA to modify distribution. When removing two virtual machines from OFCS 301, controller 320 may send a DOCA request to front-end distributor 318 requesting that its load be reduced by a fraction representing 2/N, where N is the number of virtual machines assigned to OFCS 301 for charging functions. If N=10 as in FIG. 9, then the reduction request is for 2/10 (or a 20% reduction in load). Controller 320 then sends a DOCA-Report-Request (DRR) to front-end distributor 318, an example of which is as follows:

```
<DOCA-Report-Request> ::= < Diameter Header: TBD2, REQ, PXY >
        < Session-Id >
        { Auth-Application-Id }
        { Origin-Host }
        { Origin-Realm }
        { Destination-Realm }
        { Auth-Request-Type }
        { Destination-Host }
        [ Auth-Session-State ]
      * [ Class ]
        [ Origin-State-Id ]
      * [ Proxy-Info ]
      * [ Route-Record ]
        { OC-Scope }
        [ OC-Algorithm ]
        [ OC-Action ]
        [ OC-Tocl ]
        [ OC-Applications ]
      * [ OC-Information ]
      * [ AVP ]
```

DOCA uses two states of operation: one that maintains states between peers, and the other that does not. The major difference between the two states is the amount of information that is passed in each case, with the stateful transaction mode being somewhat cryptic and the stateless mode being more communication-intensive.

In the stateless mode of DOCA, the Diameter peers (i.e., front-end distributor 318 and OFCS 301) can generally ignore the OC-Algorithm, OC-Tocl, and OC-Application Attribute Value Pairs (AVPs) from the DRR and the DOCA-Request-Answer. The OC-Action may be set to 'Start', value 1, to indicate the beginning of the overload condition to front-end distributor 318. The OC-Applications can be left out, as OFCS 301 is running only one application (namely, the Diameter Base protocol for offline charging). The OC-Information is a grouped AVP as follows:

```
OC-Information ::= < AVP Header: TBD3 >
    { OC-Origin }
    { OC-Best-Before }
    [ OC-Level ]
    [ OC-Algorithm ]
    [ OC-Sending-Rate ]
    [ Vendor-Id ]
    [ OC-Applications ]
    [ Product-Name ]
    [ OC-Utilization ]
    [ OC-Priority ]
  * [ AVP ]
```

The OC-Algorithm may be set to 'Throttle' (0x00000004) to indicate the message sending rate should be according to the OC-Sending-Rate. The OC-Level AVP may be set to Alarming (3) or Panic (4) to indicate to front-end distributor 318 to apply immediate load throttling measures for OFCS 301. The OC-Utilization AVP may be set to a value of 100 to indicate that OFCS 301 should not be considered for any further session handling. The OC-Tocl AVP may be set to 120000 (in milliseconds, this is the default value). The OC-Sending-Rate AVP may be set to "Originally negotiated value*(N−2)/N". This represents the movement of two virtual machines away from OFCS 301, and the reduced throughput available at OFCS 301.

The OC-Best-Before AVP may be set to 'current time+T1 seconds', where T1 seconds represents the time taken to complete the process of the software upgrade plus an added buffer. The OC-Origin AVP may be set to represent OFCS 301 and its realm. The OC-Priority AVP may be set to a middle value, such as 0x0000ffff, to distinguish it from the case where OFCS 301 faces a real overload condition that must be indicated to front-end distributor 318.

In response to the DCC, front-end distributor 318 responds with a DOCA-Report-Answer. An example of an answer is as follows:

```
<DOCA-Report-Answer> ::= < Diameter Header: TBD2, PXY >
  < Session-Id >
  { Result-Code }
  { Origin-Host }
  { Origin-Realm }
  [ Auth-Session-State ]
  * [ Class ]
  [ Error-Message ]
  [ Error-Reporting-Host ]
  [ Failed-AVP ]
  [ Origin-State-Id ]
  * [ Redirect-Host ]
  [ Redirect-Host-Usage ]
  [ Redirect-Max-Cache-Time ]
  * [ Proxy-Info ]
  { OC-Scope }
  [ OC-Algorithm ]
  [ OC-Action ]
  [ OC-Tocl ]
  [ OC-Applications ]
  * [ OC-Information ]
  * [ AVP ]
```

If the DOCA-Report-Answer contains no error, then OFCS 301 re-organizes the processing distribution among the remaining virtual machines.

In the second progression 902, controller 320 removes another pair of CF virtual machines from OFCS 301, and constructs a pair of I/O virtual machines in OFCS 601. When removing two more virtual machines from OFCS 301, controller 320 sends another DOCA-Report-Request to front-end distributor 318, with the following changes from the previous DRR: the OC-Action may be set to 'Interim', value 3, to indicate continuation of an ongoing overload condition, and the OC-Sending-Rate AVP may be set to "Originally negotiated value*(N−4)/N". This represents the movement of two more virtual machines away from OFCS 301. Front-end distributor 318 responds with a DOCA-Report-Answer. If the DOCA-Report-Answer contains no errors, then OFCS 301 re-organizes the processing distribution among the remaining virtual machines.

In the third progression 903, controller 320 removes another pair of CF virtual machines from OFCS 301, and constructs a pair of CF virtual machines in OFCS 601. When removing two more virtual machines from OFCS 301, controller 320 sends another DOCA-Report-Request to front-end distributor 318, with the following changes from the previous DRR: the OC-Sending-Rate AVP may be set to "Originally negotiated value*(N−6)/N". This represents the movement of two more virtual machines away from OFCS 301. At this time, OFCS 601 is ready to handle traffic from front-end distributor 318 with the newly constructed CF virtual machines. Therefore, OFCS 601 informs front-end distributor 318 about its presence, and also informs front-end distributor 318 about its weight-bearing capacity (which is the original capacity of OFCS 301*2/N). Controller 320 also sends a DOCA-Report-Request to front-end distributor 318 requesting an increased distribution of accounting requests.

Controller 302 repeats sending DOCA-Report-Requests to front-end distributor 318 when removing virtual machines for subsequent progressions 904-907. When the CF virtual machines are removed from OFCS 301, OFCS 301 may be left with two pilot virtual machines and two I/O virtual machines. At this point, controller 320 sends a DOCA-Request-Report with the following values of AVPs: OC-Level AVP may be set to 'Switch Servers'. This informs front-end distributor 318 to stop sending anymore traffic to OFCS 301 and stop communicating with it completely.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

I claim:

1. A charging system comprising:
   a controller coupled to a first offline charging system having a plurality of virtual machines implementing charging functions for offline charging, and coupled to a front-end distributor configured to distribute accounting requests to the first offline charging system;
   the controller configured to provide a software upgrade by iteratively performing the following:
      identify a subset of the virtual machines in the first offline charging system to remove from service;
      transmit a first request to the front-end distributor to reduce distribution of the accounting requests to the first offline charging system in proportion to a number of the virtual machines removed from service in the first offline charging system;
      remove the subset of virtual machines from service in the first offline charging system;

construct updated virtual machines having the software upgrade in a second offline charging system to replace the virtual machines removed from service in the first offline charging system; and transmit a second request to the front-end distributor to increase distribution of the accounting requests to the second offline charging system in proportion to a number of the updated virtual machines constructed in the second offline charging system;

wherein the controller is configured to direct a virtual machine in the first offline charging system to store data for a first accounting session in cloud storage before being removed, wherein the first accounting session is active when the virtual machine is removed from service; and wherein the controller is configured to direct an updated virtual machine constructed in the second offline charging system to retrieve the data for the first accounting session from the cloud storage, and to resume processing for the first accounting session based on the data.

2. The charging system of claim 1 wherein:
the first request comprises a Diameter Overload Control Application request.

3. The charging system of claim 1 wherein:
the front-end distributor comprises a Diameter Routing Agent (DRA).

4. The charging system of claim 1 wherein:
each of the plurality of virtual machines in the first offline charging system implements a Charging Data Function (CDF) and a Charging Gateway Function (CGF).

5. The charging system of claim 1 wherein the controller is configured to:
direct each of the plurality of virtual machines in the first offline charging system to communicate with the cloud storage, and to store data for accounting sessions in the cloud storage.

6. The charging system of claim 1 wherein the controller is configured to:
direct the updated virtual machine to generate a Charging Data Record (CDR) for the first accounting session based on the data retrieved from the cloud storage.

7. The charging system of claim 1 wherein:
the subset of the virtual machines in the first offline charging system comprises a pair of virtual machines.

8. A method for performing a software upgrade in offline charging systems, the method comprising:
identifying, at a controller, a first offline charging system having a plurality of virtual machines implementing charging functions for offline charging, wherein the virtual machines of the first offline charging system run software that is out of date; and
iteratively performing at the controller:
identifying a subset of the virtual machines in the first offline charging system to remove from service;
transmitting a first request to a front-end distributor that distributes accounting requests to the first offline charging system, wherein the first request is to reduce distribution of the accounting requests to the first offline charging system in proportion to a number of the virtual machines removed from service in the first offline charging system;
removing the subset of virtual machines from service in the first offline charging system;
constructing updated virtual machines having the software upgrade in a second offline charging system to replace the virtual machines removed from service in the first offline charging system; and transmitting a second request to the front-end distributor to increase distribution of the accounting requests to the second offline charging system in proportion to a number of the updated virtual machines constructed in the second offline charging system;
directing a virtual machine in the first offline charging system to store data for a first accounting session in cloud storage before being removed, wherein the first accounting session is active when the virtual machine is removed from service;
directing an updated virtual machine constructed in the second offline charging system to retrieve the data for the first accounting session from the cloud storage; and
resuming processing in the updated virtual machine for the first accounting session based on the data.

9. The method of claim 8 wherein:
the first request comprises a Diameter Overload Control Application request.

10. The method of claim 8 wherein:
the front-end distributor comprises a Diameter Routing Agent (DRA).

11. The method of claim 8 wherein:
each of the plurality of virtual machines in the first offline charging system implements a Charging Data Function (CDF) and a Charging Gateway Function (CGF).

12. The method of claim 8 further comprising:
directing each of the plurality of virtual machines in the first offline charging system to store data for accounting sessions in the cloud storage.

13. The method of claim 8 further comprising:
directing the updated virtual machine to generate a Charging Data Record (CDR) for the first accounting session based on the data retrieved from the cloud storage.

14. The method of claim 8 wherein:
the subset of the virtual machines in the first offline charging system to remove from service comprises a pair of virtual machines.

15. A charging system comprising:
a controller configured to provide a software upgrade for a first offline charging system, wherein the first offline charging system includes a plurality of virtual machines implementing charging functions for offline charging;
the controller is configured to iteratively perform the following:
identify a subset of the virtual machines in the first offline charging system to remove from service;
transmit a first Diameter Overload Control Application request to a front-end distributor that distributes accounting requests to the first offline charging system, wherein the first Diameter Overload Control Application request is to reduce the distribution of the accounting requests to the first offline charging system in proportion to a number of the virtual machines removed from service in the first offline charging system;
remove the subset of virtual machines from service in the first offline charging system;
construct updated virtual machines having the software upgrade in a second offline charging system to replace the virtual machines removed from service in the first offline charging system; and
transmit a second Diameter Overload Control Application request to the front-end distributor to increase distribution of the accounting requests to the second offline charging system in proportion to a number of the updated virtual machines constructed in the second offline charging system;

wherein the controller is configured to direct a virtual machine in the first offline charging system to store data for a first accounting session in cloud storage before being removed, wherein the first accounting session is active when the virtual machine is removed from service; and wherein the controller is configured to direct an updated virtual machine constructed in the second offline charging system to retrieve the data for the first accounting session from the cloud storage, and to resume processing for the first accounting session based on the data.

16. The charging system of claim 15 wherein:

each of the plurality of virtual machines in the first offline charging system implements a Charging Data Function (CDF) and a Charging Gateway Function (CGF).

17. The charging system of claim 15 wherein:

the controller is configured to insert a reduction value in an OC-Sending-Rate Attribute Value Pair (AVP) of the first Diameter Overload Control Application request.

18. The charging system of claim 17 wherein:

the subset of the virtual machines in the first offline charging system to remove from service comprises a pair of virtual machines;

the number of virtual machines in the first offline charging system comprises N; and the controller is configured to insert a reduction value in an OC-Sending-Rate Attribute Value Pair (AVP) of (N−2)/N.

* * * * *